United States Patent [19]

Hibino et al.

[11] Patent Number: 5,684,473

[45] Date of Patent: Nov. 4, 1997

[54] MEASURING APPARATUS FOR DETECTING DISTANCE BETWEEN VEHICLES AND RELATED WARNING SYSTEM

[75] Inventors: Katsuhiko Hibino, Toyoake; Noriaki Shirai, Oobu; Takao Nishimura, Nagoya, all of Japan

[73] Assignee: Nippondenso Co., Ltd., Kariya, Japan

[21] Appl. No.: 409,528

[22] Filed: Mar. 24, 1995

[30] Foreign Application Priority Data

Mar. 25, 1994 [JP] Japan .................................. 6-055966

[51] Int. Cl.$^6$ .................................................. G08G 1/16
[52] U.S. Cl. .................... 340/903; 340/438; 340/436; 340/904; 364/424.01; 180/271
[58] Field of Search .................................. 340/439, 438, 340/903, 904, 435, 436; 364/461, 424.01; 180/271, 167

[56] References Cited

U.S. PATENT DOCUMENTS

| | | | |
|---|---|---|---|
| 5,249,157 | 9/1993 | Taylor | 340/903 |
| 5,314,037 | 5/1994 | Shaw et al. | 340/903 X |
| 5,347,273 | 9/1994 | Katirgie | 340/903 |
| 5,357,438 | 10/1994 | Davidian | 364/461 |
| 5,410,304 | 4/1995 | Hahn et al. | 340/903 |

FOREIGN PATENT DOCUMENTS

| | | |
|---|---|---|
| 4-60482 | 2/1992 | Japan . |
| 4-201643 | 7/1992 | Japan . |
| 5-166097 | 7/1993 | Japan . |
| 6-44500 | 2/1994 | Japan . |

*Primary Examiner*—Jeffery Hofsass
*Assistant Examiner*—Daryl C. Pope
*Attorney, Agent, or Firm*—Cushman, Darby & Cushman IP Group of Pillsbury Madison & Sutro LLP

[57] ABSTRACT

A measuring apparatus for measuring an actual distance between vehicles and comparing the measured distance with a reference distance. The reference distance (SL) is obtained on the basis of: a personal space (VR·TIMEK) being an uneasy distance peculiar to a driver and obtained in accordance with the own vehicle speed; a free running distance (VRR·TIMEN) corresponding to a response time of a driver's braking operation and a relative speed between two vehicles; a braking distance (VRR$^2$/(2·GR)) corresponding to a depressing strength of a braking pedal in the driver's braking operation and the relative speed; and an acceleration change distance ($\alpha G \cdot GA$) corresponding to a relative acceleration between the two vehicles, using the following equation:

$$SL = VR \cdot TIMEK - VRR \cdot TIMEN + VRR^2/(2 \cdot GR) - \alpha G \cdot GA$$

where VR represents the own vehicle speed, TIMEK represents an uneasy factor, VRR represents the relative speed, TIMEN represents a response factor of the driver's braking operation, GR represents a braking deceleration factor, $\alpha G$ represents a preceding vehicle acceleration, and GA represents a preceding vehicle deceleration factor.

26 Claims, 12 Drawing Sheets

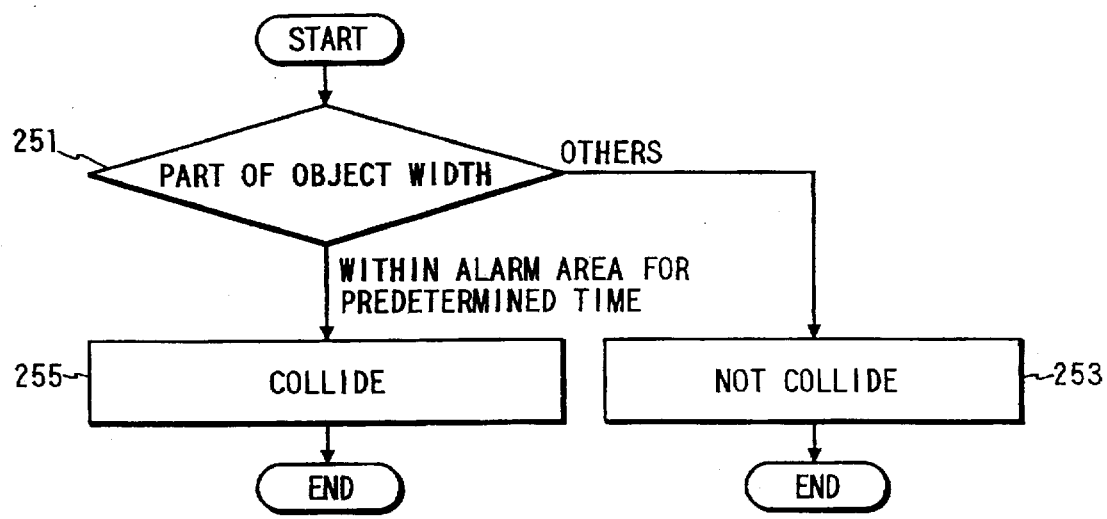
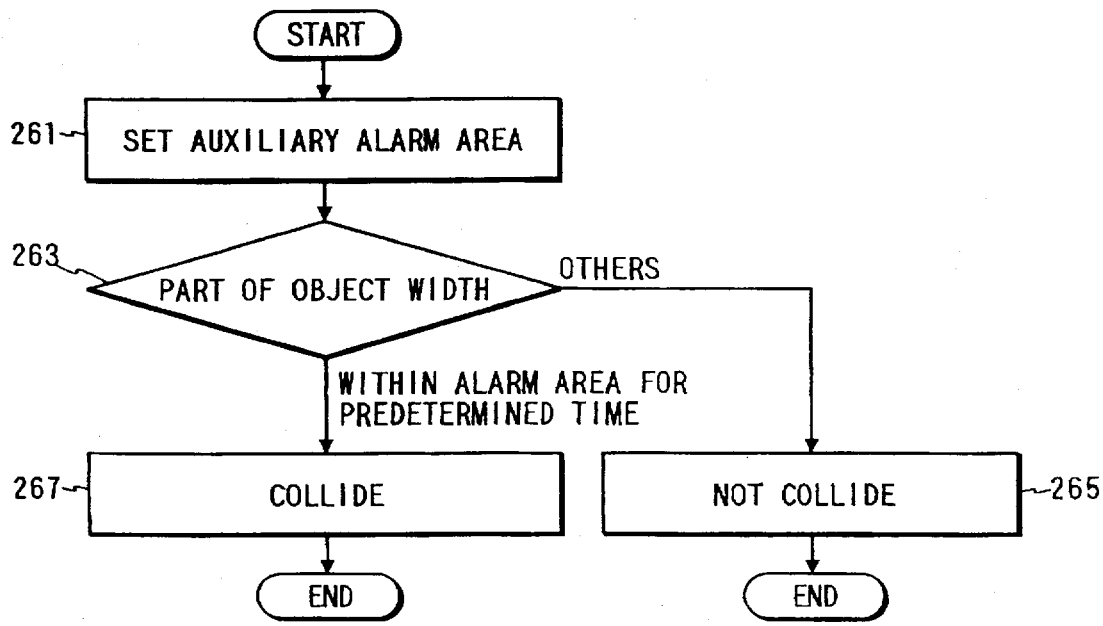

MEASURING APPARATUS FOR DETECTING DISTANCE BETWEEN VEHICLES AND RELATED WARNING SYSTEM

BACKGROUND OF THE INVENTION

1. Field of the Invention

This invention relates to a measuring apparatus for detecting a distance between vehicles running in the same direction and judging whether or not a predetermined safe distance is kept therebetween, and a related warning system for generating alarm when an actual distance between two vehicles is shorter than the predetermined safe distance.

2. Related Art

According to conventional technologies, as disclosed in Unexamined Japanese patent applications Nos. 166097/1993 and 201643/1992, there is known a warning device for giving warning to a driver of a following vehicle when a distance to a preceding vehicle is not satisfactory to avoid the danger. More specifically, the Unexamined Japanese patent application No. 166097/1993 shows an improvement in that it predicts the collision time on the basis of relative running conditions between two, preceding and following, vehicles. On the other hand, the Unexamined Japanese patent application No. 201643/1992, which also calculates a safe distance on the basis of relative running conditions, is precise in that it takes both braking distances and free running distances of two vehicles into consideration.

However, according to the above conventional apparatuses, there were some problems described below.

Both a collision time and a safe distance are univocally determined irrespective of driver's driving techniques. That is, each vehicle is driven by a human being who has own sex, age, and physical ability, and is unique in his/her behavior and senses. Disregarding such individual differences among drivers will make some of drivers feel that the system equipped in his/her own vehicle is inaccurate and unreliable in the abilities for measuring a safe or collision distance or for generating alarm. For veteran drivers, a uniformly determined safe distance may be too long to feel danger and alarm may be felt too many and irritant to listen. On the contrary, for elder or less-experienced drivers, the same alarm may be felt too few and late to avoid the encountered danger.

Once the driver judges that his/her system is incorrect and unreliable, the driver no longer relies on it and will turn off the switch of such a system; thus, the system cannot work as intended.

SUMMARY OF THE INVENTION

Accordingly, in view of above-described problems encountered in the related art, a principal object of the present invention is to provide an accurate and reliable measuring apparatus capable of detecting a safe inter-vehicle distance peculiar to each driver by taking account of individual drivers' senses and physical abilities and, as a result, for providing an alarming system capable of giving alarm at an adequate time which meets the individuality of each driver.

In order to accomplish this and other related objects, a first aspect of the present invention provides a measuring apparatus for detecting a distance between vehicles running in the same direction, the apparatus comprising: first means for obtaining a personal space in accordance with a vehicle speed of a measuring apparatus equipped vehicle (the personal space being an uneasy distance peculiar to a driver); second means for obtaining a free running distance on the basis of a response time of a driver's braking operation and a relative speed between a preceding vehicle and the measuring apparatus equipped vehicle; third means for obtaining a braking distance on the basis of a depressing strength of a braking pedal in the driver's braking operation and the relative speed; fourth means for obtaining a reference distance on the basis of the personal space obtained by the first means, the free running distance obtained by the second means, and the braking distance obtained by the detecting means; and fifth means for judging whether an actual distance between the preceding vehicle and the measuring apparatus equipped vehicle is reduced less than the reference distance obtained by the fourth means.

In the above measuring apparatus, it is preferable that the fourth means calculates the reference distance using the following formula:

$$VR \cdot TIMEK - VRR \cdot TIMEN + VRR^2/(2 \cdot GR)$$

where VR represents the vehicle speed of the measuring apparatus equipped vehicle, TIMEK represents an uneasy factor expressed by time corresponding to the personal space, VRR represents the relative speed, TIMEN represents a response factor corresponding to the response time of the driver's braking operation, and GR represents a braking deceleration factor corresponding to the depressing strength of the braking pedal in the driver's braking operation.

A second aspect of the present invention provides a measuring apparatus for detecting a distance between vehicles running in the same direction, the apparatus comprising: first means for obtaining a personal space in accordance with a vehicle speed of a measuring apparatus equipped vehicle (the personal space being an uneasy distance peculiar to a driver); second means for obtaining a free running distance on the basis of a response time of a driver's braking operation and a relative speed between a preceding vehicle and the measuring apparatus equipped vehicle; third means for obtaining a braking distance on the basis of a depressing strength of a braking pedal in the driver's braking operation and the relative speed; fourth means for obtaining an acceleration change distance on the basis of a relative acceleration between a preceding vehicle and the measuring apparatus equipped vehicle; fifth means for obtaining a reference distance on the basis of the personal space obtained by the first means, the free running distance obtained by the second means, the braking distance obtained by the third means, and the acceleration change distance obtained by the fourth means; and sixth means for judging whether an actual distance between the preceding vehicle and the measuring apparatus equipped vehicle is reduced less than the reference distance obtained by the fifth means.

In the second aspect measuring apparatus, it is preferable that the fifth means calculates the reference distance using the following formula:

$$VR \cdot TIMEK - VRR \cdot TIMEN + VRR^2/(2 \cdot GR) - \alpha G \cdot GA$$

where VR represents the vehicle speed of the measuring apparatus equipped vehicle, TIMEK represents an uneasy factor expressed by time corresponding to the personal space, VRR represents the relative speed, TIMEN represents a response factor corresponding to the response time of the driver's braking operation, GR represents a braking deceleration factor corresponding to the depressing strength of the braking pedal in the driver's braking operation, $\alpha G$ represents an acceleration of the preceding vehicle, and GA represents a preceding vehicle deceleration factor corresponding to a depressing strength of a braking pedal in a braking operation by a driver in the preceding vehicle, felt by the driver of the measuring apparatus equipped vehicle.

In a preferable mode, the response time of the driver's braking operation, and the depressing strength of the braking pedal in the driver's braking operation are determined based on experiential data collected from driver's driving conditions.

Running conditions of the preceding vehicle and the measuring apparatus equipped vehicle are measured as experiential data in relation to braking conditions of the measuring apparatus equipped vehicle, and the reference distance is corrected based on the experiential data.

The reference distance is manually adjustable.

The factors TIMEK, TIMEN and GR (and GA) are variable to adjust the reference distance.

The factors TIMEK, TIMEN and GR (and GA) are varied with a predetermined correlation therebetween.

Furthermore, there is provided an alarm means for generating alarm when the actual distance between the preceding vehicle and the measuring apparatus equipped vehicle is reduced less then the reference distance.

A collision predicting means can be provided for detecting a possibility of collision, when detects that the actual distance between the preceding vehicle and the measuring apparatus equipped vehicle is reduced less than the reference distance, thereby making the alarm means generate alarm in response to detection of possibility of collision by the collision judging means.

The personal space, the response time of the driver's braking operation, and the depressing strength of the braking pedal in the driver's braking operation are determined based on experiential data collected from driver's driving conditions.

BRIEF DESCRIPTION OF THE DRAWINGS

The above and other objects, features and advantages of the present invention will become more apparent from the following detailed description which is to be read in conjunction with the accompanying drawings, in which:

FIG. 8 is a flow chart showing a collision judgement in accordance with the present invention;

FIG. 9 is a flow chart showing an auxiliary collision judgement in accordance with the present invention;

DETAILED DESCRIPTION OF THE PREFERRED EMBODIMENTS

A preferred embodiment of a collision alarm system in accordance with the first embodiment of the present invention will be explained with reference to FIGS. 1 and 2. Identical parts are denoted by identical reference number throughout views.

A collision alarm system 1, installed or equipped in an automotive vehicle, captures optically or electromagnetically or acoustically various objects running or stationary in front of the vehicle. When a concerned object comes in a dangerous zone, the possibility of collision is judged. Based upon the judgement result, alarm is generated to let a driver know the coming-up danger.

Figure 1:
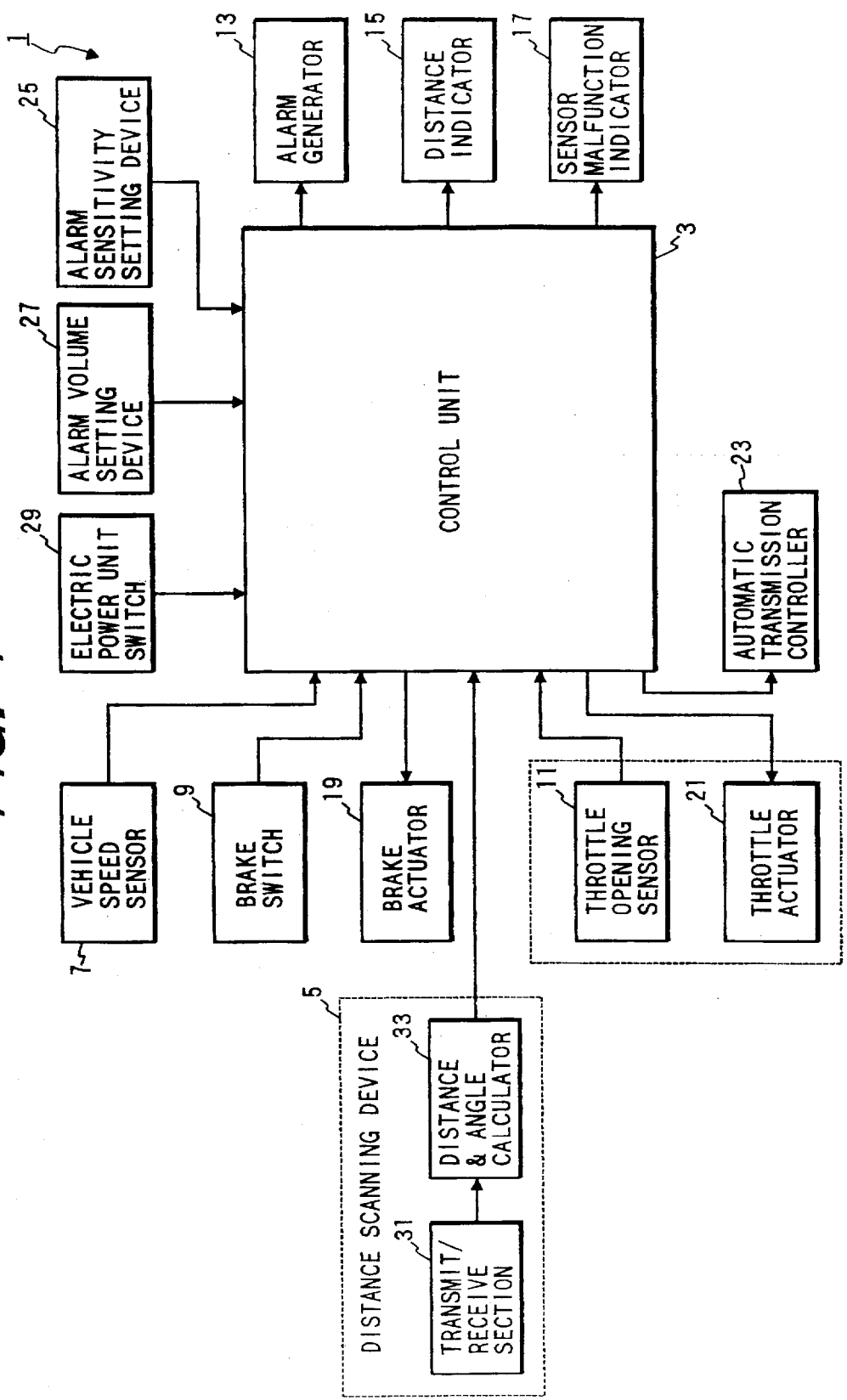
FIG. 1 is a schematic block diagram showing one embodiment of a collision alarm system in accordance with the present invention.

FIG. 1 is a schematic block diagram showing the collision alarm system 1. The collision alarm system 1 comprises a control unit 3 as a main component including a micro computer with I/O interfaces and various drive and detecting circuits. These components have the generally well-known hardware arrangement and, therefore, will not be explained in detail.

The control unit 3 receives various measured signals detected by a distance scanning device 5, a vehicle speed sensor 7, a brake switch 9, and a throttle opening sensor 11.

The control unit 3 generates various drive signals to be sent to an alarm generator 13, a distance indicator 15, a sensor malfunction indicator 17, a brake actuator 19, a throttle actuator 21, and an automatic transmission controller 23.

The control unit 3 further comprises an alarm sensitivity setting device 25 and an alarm volume setting device 27, with which alarm timing and volume or later-described processing are controlled. The control unit 3 comprises an electric power unit switch 29, with a turning-on operation of which electric power is supplied to the control unit 3 to start predetermined processing.

The distance scanning device 5 comprises a transmit/receive section 31 and a distance & angle calculator 33. The transmit/receive section 31 emits a laser beam in the forward direction of the vehicle with a predetermined scanning angle, and detects a returning laser beam reflected from an object in front of the vehicle. The distance & angle calculator 33 detects a relative speed, a distance and position coordinates to the preceding object on the basis of a time required from the moment the laser beam is emitted therefrom to the moment the returning laser beam is captured.

The arrangement of such a distance scanning device is well known and, therefore, details of the distance scanning device 5 will not be explained.

Besides the ones capable of detecting all of relative speed, distance, and position coordinates to the preceding object, it is also possible to use a one detecting only the relative speed and distance to the preceding vehicle. Furthermore, the laser beam can be replaced by electromagnetic waves, such as micro wave, or supersonic waves.

The control unit 3, thus arranged, measures a distance between the preceding vehicle and its own vehicle (i.e. the vehicle equipped with the collision alarm system 1); this distance is, hereinafter, referred to as an inter-vehicle distance. And, the control unit 3 detects the moment that the inter-vehicle distance is reduced less than a reference distance determined based on running conditions of the two, preceding and following, vehicles. Furthermore, the control unit 3 judges the possibility of collision of vehicles in response to the above detection of dangerous situation, thereby generating alarm if necessary based on the judgement result.

The brake actuator 19, the throttle actuator 21 and the automatic transmission controller 23, shown in FIG. 1, are cooperatively used for executing a so-called cruising control, which controls the speed of the system equipped vehicle (i.e. the own vehicle) in accordance with the speed of the preceding vehicle.

Figure 2:
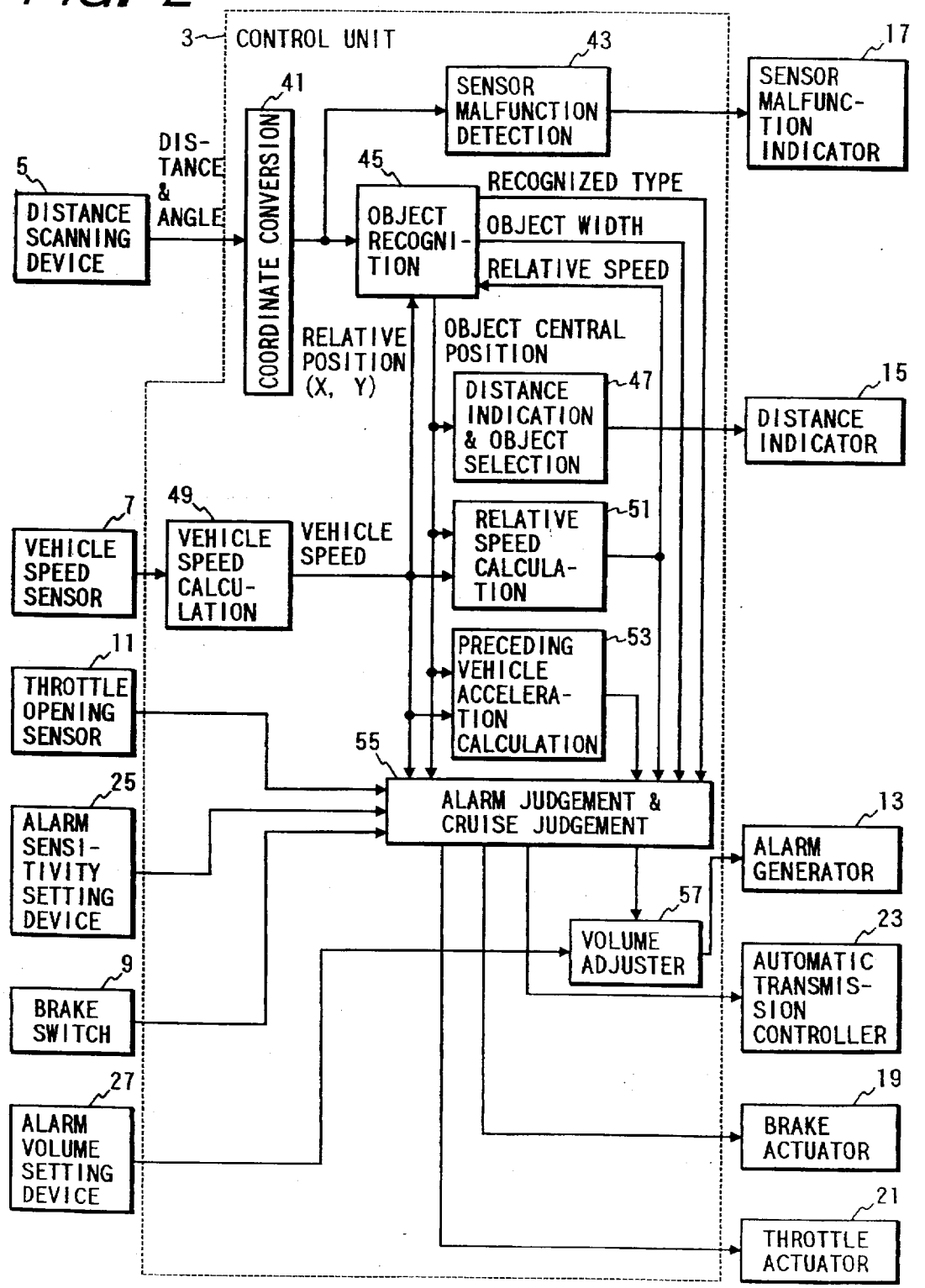
FIG. 2 is a block diagram showing details of a control unit in the collision alarm system in accordance with the present invention.

FIG. 2 is a block diagram showing details of the control unit 3 of the collision alarm system 1. Distance and angle data, generated from the distance & angle calculator 33 of the distance scanning device 5, are converted by a coordinate conversion block 41 into data expressed by the XY rectangular coordinates system with an origin corresponding to the system equipped vehicle. A sensor malfunction detecting block 43 checks whether or not the converted data are abnormal, and causes a sensor abnormal indicator 17 to display the malfunction of a corresponding sensor.

An object recognition block 45 obtains the recognition type, width and central position of the object on the basis of the mutual speed between the XY rectangular coordinate system and the system equipped vehicle. The recognition type represents the result of a judgement as to whether the detected object is recognized as a mobile object or a stationary object. A distance indication & object selection block 47 selects, on the basis of the central position of the object, an object to be displayed which gives an effect on travelling of the own vehicle, and causes the distance indicator 15 to display a concerned distance to that object.

A vehicle speed calculating block 49, connected to the vehicle speed sensor 7, generates a vehicle speed (i.e. own vehicle speed) representative of an output of the vehicle speed sensor 7. A relative speed calculating block 51, receiving both the vehicle speed generated from the vehicle speed calculating block 49 and the central position obtained by the object recognition block 45, obtains a relative speed of the preceding vehicle with respect to the own vehicle. A preceding vehicle acceleration calculating block 53, also receiving both the vehicle speed generated from the vehicle speed calculating block 49 and the central position obtained by the object recognition block 45, obtains an acceleration of the preceding vehicle (i.e. a relative acceleration of the preceding vehicle with respect to the own vehicle).

An alarm judgement & cruise judgement block 55, receiving the own vehicle speed, the preceding vehicle relative speed, the preceding vehicle acceleration, the object central position, the object width, the recognition type, an output of the brake switch 9, a throttle opening degree detected by the throttle opening sensor 11, and a sensitivity setting level by the alarm sensitivity setting device 25, makes an alarm judgement as to whether the alarm is necessary and also makes a cruise judgement as to what kind of content is determined for the vehicle speed control.

When the alarm is required as a result of above judgements, the alarm judgement & cruise judgement block 55 generates an alarm generating signal to the alarm generator 13 via a volume adjuster 57. The volume adjuster 57 controls an output volume of the alarm generator 13 in accordance with a setting value of the alarm volume setting device 27.

When the cruise control is required as a result of above judgements, the alarm judgement & cruise judgement block 55 generates necessary control signals and sends them to the automatic transmission controller 23, the brake actuator 19 and the throttle actuator 21, thereby executing the desired cruising control.

The alarm judgement and alarming operation by the alarm judgement & cruise judgement block 55 will be explained in greater detail.

Figure 3:
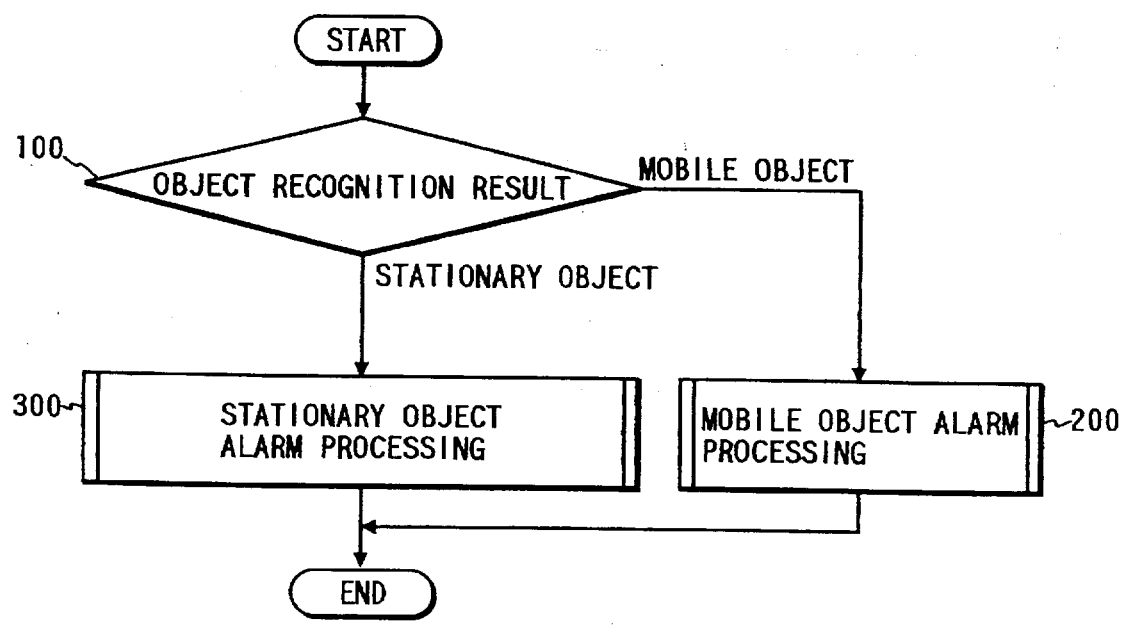
FIG. 3 is a flow chart showing an inter-vehicle distance judgement & collision alarm processing in accordance with the present invention.

FIG. 3 is a flow chart showing an inter-vehicle distance judgement & collision alarm processing, which is repeatedly executed upon turning-on operation of the power unit switch 29. First, the object recognition result is checked. Namely, it is judged as to whether the concerned object is a mobile object or a stationary object (Step 100). The object recognition is carried out based on the own vehicle speed and the scanning result of the preceding object. For example, when the position of the preceding object does not change so much in relation to the own vehicle, it is believed that the preceding object is a mobile object. An object gradually departing from the own vehicle is also recognized as a mobile object. In cases other than above, objects are generally judged as a stationary object (a true stationary object or an unconfirmed object).

If the preceding object is a mobile object, a mobile object alarm processing is executed (Step 200). If the preceding object is a stationary object, a stationary object alarm processing is executed (Step 300).

The mobile object alarm processing (Step 200) will be hereinafter explained in greater detail with reference to the flow chart of FIG. 4. First, a mobile object alarm distance calculation (Step 210) is executed to obtain a mobile object alarm distance (i.e. a reference distance) SL to be used in the judgement as to whether the alarm operation is necessary. More specifically, the mobile object alarm distance (i.e. reference distance) SL is calculated using the following equation (1).

$$SL = VR \cdot TIMEK - VRR \cdot TIMEN + VRR^2/(2 \cdot GR) - \alpha G \cdot GA \qquad (1)$$

where

VR represents the own vehicle speed (m/s);

TIMEK represents an uneasy inter-vehicle factor (s) expressed by time corresponding to an inter-vehicle distance uneasy to a driver of the own vehicle;

VRR represents the relative speed (m/s) of the preceding vehicle with respect to the own vehicle, indicating that the two vehicles are approaching when VRR is negative;

TIMEN represents a response time factor (s) corresponding to the response time of a driver's braking operation of the own vehicle;

GR represents a braking deceleration factor (m/s$^2$) corresponding to the depressing strength of the braking pedal in the driver's braking operation of the own vehicle;

αG represents an acceleration (m/s$^2$) of the preceding vehicle (i.e. a relative acceleration of the preceding vehicle with respect to the own vehicle); and GA represents a preceding vehicle deceleration factor (s$^2$) corresponding to a depressing strength of a braking pedal in a braking operation by a driver in the preceding vehicle, felt by the driver of the own vehicle.

Among above data, the own vehicle speed VR is directly obtained from the vehicle speed sensor 7. The relative speed VRR and the preceding acceleration αG are obtained based on relative positional change between two vehicles which is detectable by the distance scanning device 5. The uneasy inter-vehicle factor TIMEK, the response time factor TIMEN, the braking deceleration factor GR and the preceding vehicle deceleration factor GA are calculated from experiential data measured in advance by a measuring device installed on the vehicle.

After all, VR·TIMEK represents an actual inter-vehicle distance uneasy to the driver of the own vehicle. VRR·TIMEN represents a free running distance. VRR$^2$/(2·GR) represents a braking distance, and αG·GA represents an acceleration change distance.

Measurement of above data is executed in the following manner.

Figure 11A:
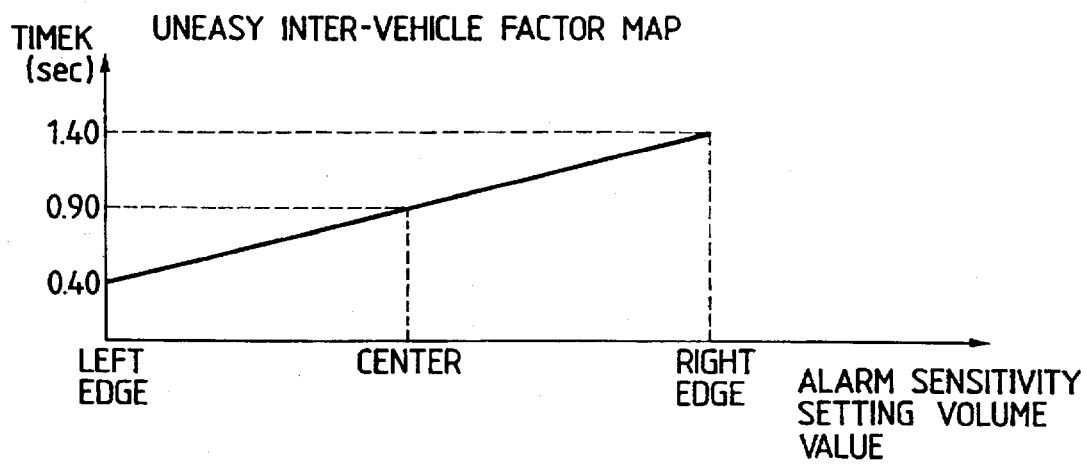
FIG. 11A is a map showing an uneasy inter-vehicle factor with reference to an alarm sensitivity setting volume value in accordance with the present invention.

The uneasy inter-vehicle factor TIMEK is obtained by dividing an actual inter-vehicle distance uneasy to the own vehicle driver by the own vehicle speed at that moment. Through numerous monitoring operations, a plurality of resultant values are averaged, thereby acquiring the uneasy inter-vehicle factor TIMEK. FIG. 11A shows a map showing the uneasy inter-vehicle factor TIMEK with reference to the alarm sensitivity setting volume value. In the drawing, the center value is 0.9 sec which represents an average value. The value of the uneasy inter-vehicle factor TIMEK is adjustable in a predetermined range of 0.4–1.40 by the alarm sensitivity setting device 25. This range is provided on the basis of the standard deviation of measured values.

Figure 11B:
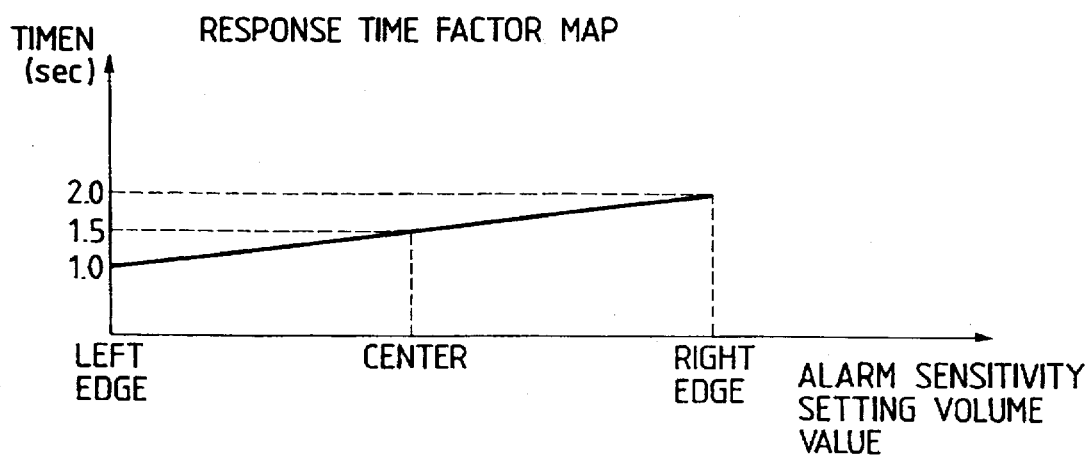
FIG. 11B is a graph showing a map of a response time factor with respect to the alarm sensitivity setting volume value in accordance with the present invention.

The response time factor TIMEN is obtained from the data relating to general human response time which are already well known to us. Of course, it is possible to actually measure the response time by conducting a plurality of monitoring operations and using average and standard deviation. FIG. 11B shows a map of such a response time factor TIMEN with respect to the alarm sensitivity setting volume value. A generally known human response time is in the range of 1.0–2.0 sec. Therefore, with the center value being set at 1.5 sec, the response time factor TIMEN is adjustable in the range of 1.0–2.0 by the alarm sensitivity setting device 25.

Figure 12A:
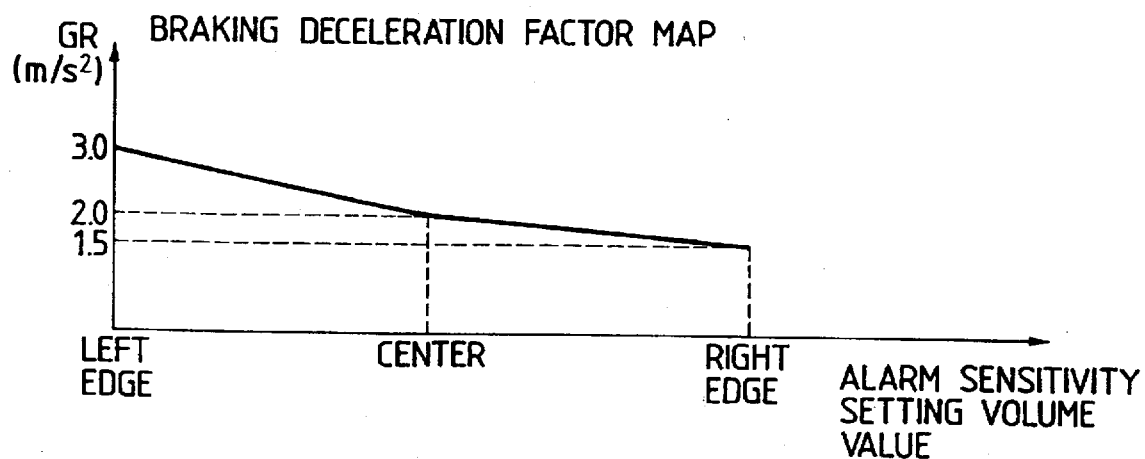
FIG. 12A is a graph showing a map of a braking deceleration factor with reference to the alarm sensitivity setting volume value in accordance with the present invention.

The braking deceleration factor GR is determined based on the experiential data measured through numerous monitoring operations, as well as the uneasy inter-vehicle factor TIMEK. FIG. 12A shows a map of the braking deceleration factor GR with reference to the alarm sensitivity setting volume value. With the center value being set at 2.0 (m/s$^2$), the braking deceleration factor GR is adjustable in the range of 1.5 (m/s$^2$)–3.0 (m/s$^2$) by the alarm sensitivity setting device 25.

Figure 12B:
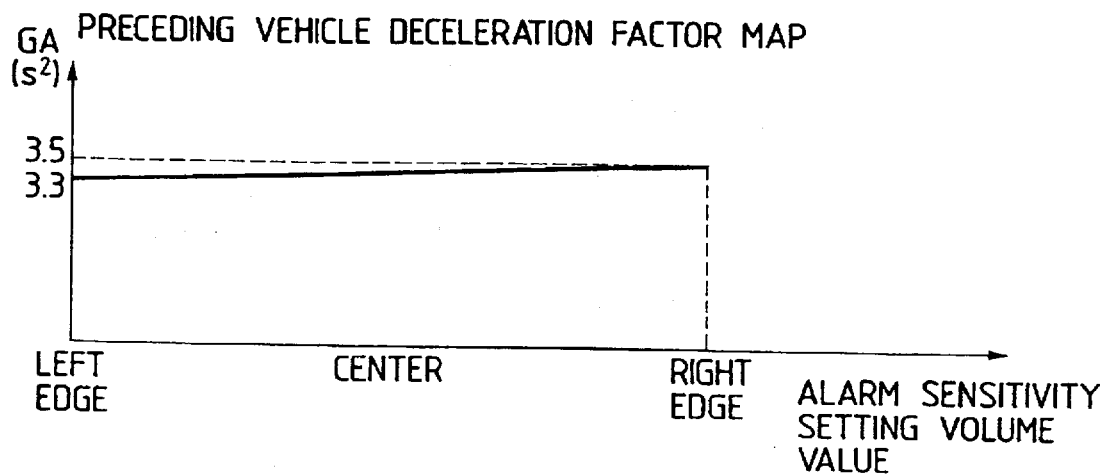
FIG. 12B is a graph showing a map of a preceding vehicle deceleration factor with reference to the alarm sensitivity setting volume value in accordance with the present invention.

The preceding vehicle deceleration factor GA is obtained in the following manner. When the preceding vehicle starts decelerating with a given deceleration, it is assumed that the own vehicle starts decelerating with the same deceleration after a response time (i.e. a response time felt by the own vehicle driver). Under such a condition, a distance required for avoiding the collision between two vehicles is obtained. Then, the resultant distance is divided by the acceleration of the preceding vehicle, to obtain the preceding vehicle deceleration factor GA. Since the calculation value of the preceding vehicle deceleration is filtered, the preceding vehicle deceleration factor GA is adjusted by doubling its value. FIG. 12B shows a map of such a preceding vehicle deceleration factor GA with reference to the alarm sensitivity setting volume value. With the center value being set at 3.4 (s$^2$), the preceding vehicle deceleration factor GA is adjustable in the range of 3.3 (s$^2$)–3.5 (s$^2$) by the alarm sensitivity setting device 25.

These factors TIMEK, TIMEN, GR and GA are memorized in a memory (ROM) of the control unit 3 as map data (FIGS. 11A, 11B, 12A and 12B).

Thus, in the step 210, the mobile object alarm distance SL is calculated using these factors TIMEK, TIMEN, GR and GA, flexibly adjusted in accordance with the setting sensitivity of the alarm sensitivity setting device 25 with a predetermined correlation therebetween, and measured values of the own vehicle speed VR, relative speed VRR and the preceding acceleration αG.

Next, the mobile object alarm distance (i.e. reference distance) SL is compared with an actual inter-vehicle distance LR, to detect whether the actual distance between the own vehicle and the preceding vehicle is not larger than the mobile object alarm distance SL (Step 210).

Figure 7:
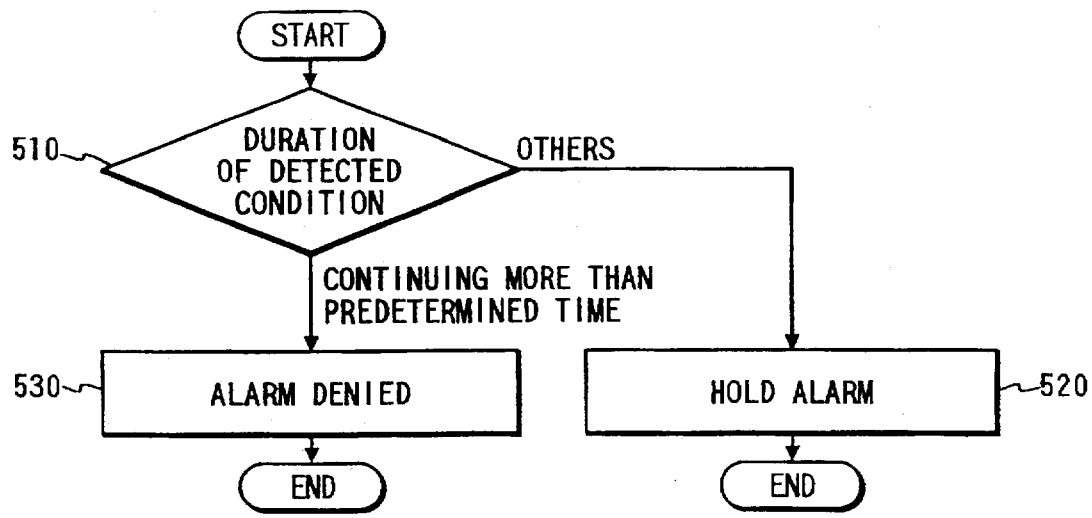
FIG. 7 is a flow chart showing a false alarm countermeasure 2 in accordance with the present invention.

If the actual inter-vehicle distance LR is larger than the mobile object alarm distance SL, a false alarm countermeasure 2 is executed (Step 230). The false alarm countermeasure 2, as shown in the flow chart of FIG. 7, provides a hysteresis to prevent the alarm from being unintendedly stopped based on a momentary result of detection. That is, a judgement is made as to whether or not this condition (LR>SL) is continuing (Step 510). If this condition is not continuing more than a predetermined period of time, the alarm is maintained (Step 520). If this condition is continuing more than the predetermined period of time, the alarm condition is denied (Step 530). In cases where the alarm condition is denied in the judgement of the step 530, the alarm generator 13 stops generating alarm.

When the actual inter-vehicle distance LR is not larger than the mobile object alarm distance SL in the step 220, a collision judgement is executed (Step 250).

FIG. 8 is a flow chart showing the details of the collision judgement, which provides a hysteresis to prevent the alarm condition from being unintendedly established based on a momentary result of detection. That is, when it is judged that the actual inter-vehicle distance LR is not larger than the mobile object alarm distance SL, a judgement is made as to whether at least part of width of the concerned object is within an alarm area (Step 251). This alarm area is a predetermined region in front of the own vehicle, designated as a dangerous region having the possibility of collision between two vehicles, and calculated based on the own vehicle's speed and acceleration and the preceding vehicle's speed and acceleration.

If the actual inter-vehicle distance LR is within this alarm area for a predetermined period of time, it is judged that there will be the collision between two vehicles (Step 255). If not, it is judged that there will be no collision between the two (Step 253).

When no collision is predicted in the collision judgement of the step 250, an auxiliary collision judgement is further executed (Step 260). FIG. 9 is a flow chart showing the auxiliary collision judgement. First, an auxiliary alarm area is set in front of the own vehicle in accordance with the speed of the own vehicle (Step 261). This auxiliary alarm area is determined by taking account of the possibility that another vehicle may cut in between the two vehicles. Unlike the above alarm area, the auxiliary alarm area is calculated simply and quickly. With provision of such an auxiliary alarm area, it becomes possible to quickly detect any vehicle cutting in suddenly between the two vehicles.

That is, a judgement is made as to whether at least part of width of any object enters the auxiliary alarm area (Step 263). If any object enters within the auxiliary alarm area for a predetermined period of time, it is judged that there will be the collision between such an object and the own vehicle (Step 267). If not, it is judged that there will be no collision between the two (Step 265).

When no collision is predicted in both the steps 250 and 260, the processing of the step 230 and the following is executed.

Figure 6:
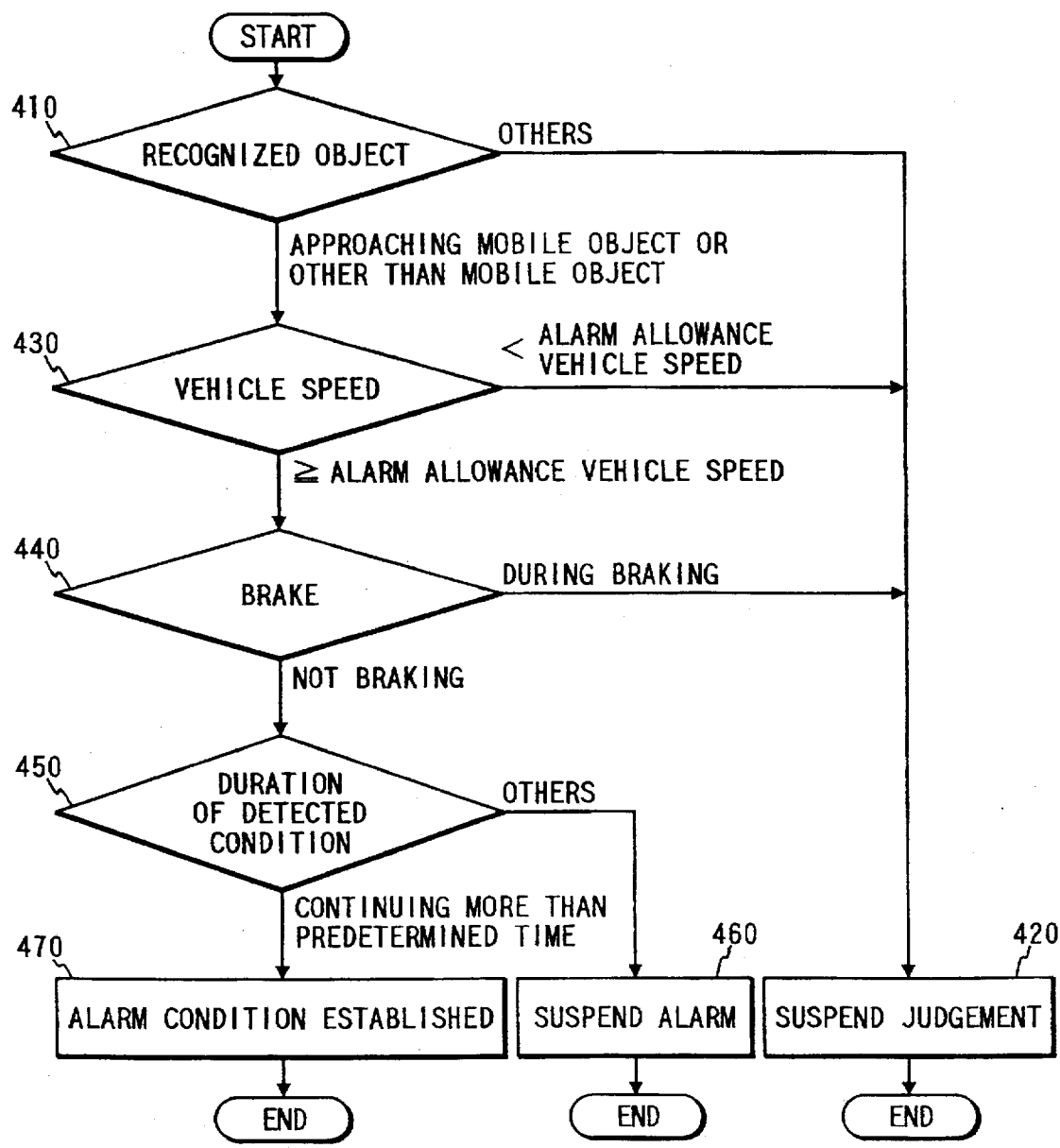
FIG. 6 is a flow chart showing a false alarm countermeasure 1 in accordance with the present invention.

When either the step 250 or the step 260 predicts the possibility of collision, then a false alarm countermeasure 1 is executed (Step 270). FIG. 6 is a flow chart showing the false alarm countermeasure 1. First, the condition of the recognized object is judged (Step 410). If the recognized object is an approaching object or other than a mobile object, the vehicle speed is judged in a step 430. If not, the judgement is suspended (Step 420). It means that there is no situation necessitating the judgement.

When the recognized object is the approaching object or other than the mobile object, the step 430 makes a judgement as to whether the own vehicle speed exceeds an alarming speed (i.e. alarm allowance speed) at and above which the own vehicle requires alarm. In other words, when the own vehicle is running at low speeds on a crowded or narrow load or in a parking lot, the vehicle will encounter with so many moving or stationary objects. Under such situations, it will be not effective to generate alarm frequently, if the vehicle speed is sufficiently low. Thus, the vehicle speed judgement of the step 430 is executed to eliminate unnecessary alarms. If the own vehicle speed is less than the alarm allowance speed, the judgement is suspended (Step 420).

If the own vehicle speed is not less than the alarm allowance, a judgement is made based on the condition of the brake switch 9 as to whether or not the own vehicle is in a braking operation (Step 440). If the vehicle is in the braking condition, the judgement is suspended (Step 420). In short, driver's applying the brake means that the driver already perceived the coming-up danger and already started the necessary operations to avoid the danger. Thus, the alarm is no longer necessary and will be rather annoying to the driver. It is therefore better to suspend the alarm operation.

If any braking is not applied, a judgement is made to provide a hysteresis as to whether the current condition is continuing more than a predetermined period of time (Step 450). If the same condition is not continuing so long, the alarm operation is suspended (Step 460). On the contrary, if the detected condition is continuing more than the predetermined time, it is considered that the alarm condition is established. (Step 470)

Figure 4:
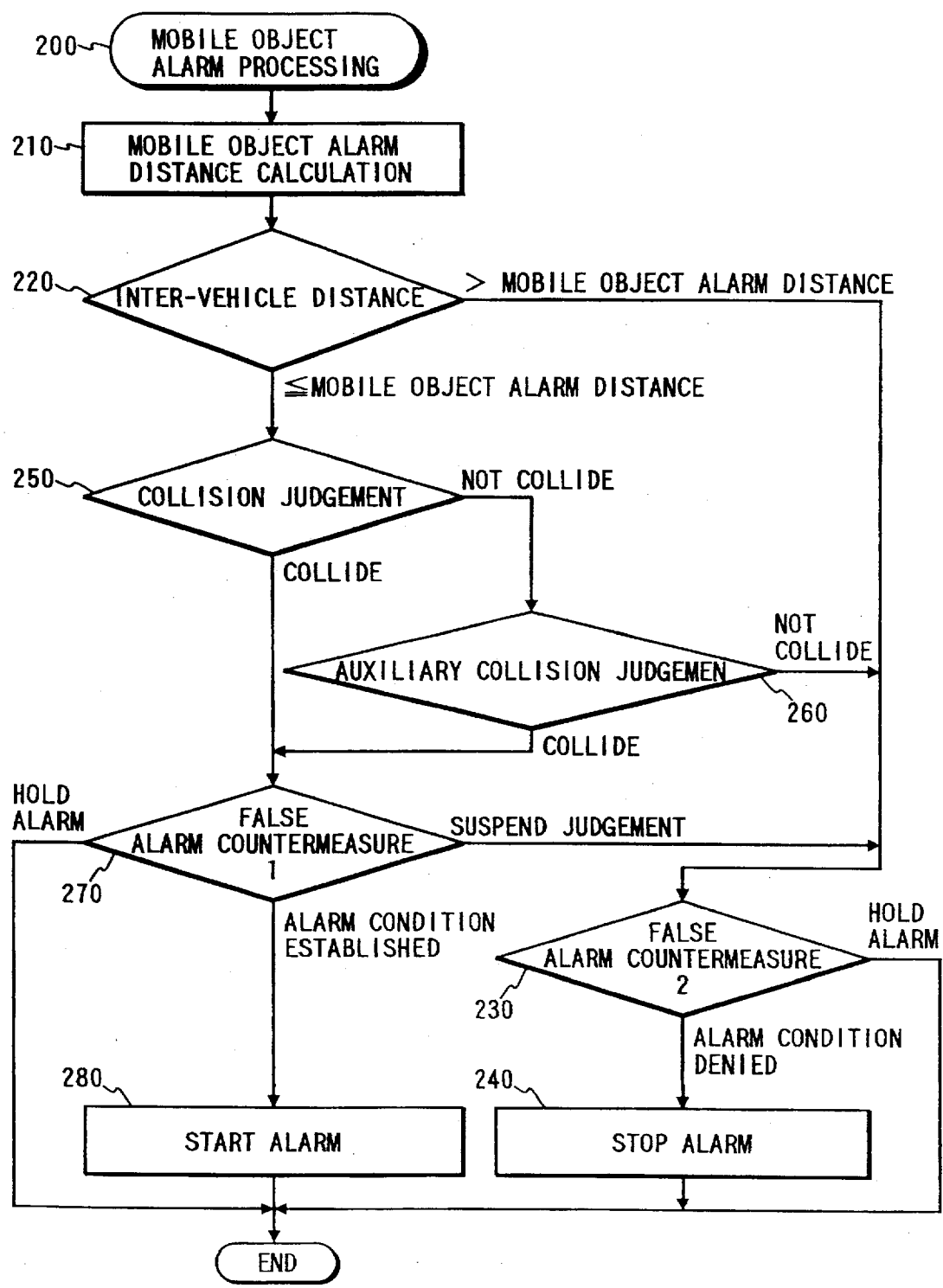
FIG. 4 is a flow chart showing a mobile object alarm processing in accordance with the present invention.

As shown in FIG. 4, when the step 270 judges that the alarm is suspended, no processing is done. When the alarm condition is established, the alarm generator 13 actually starts generating alarm (Step 280), thereby notifying the driver of the own vehicle of the coming-up danger.

Figure 5:
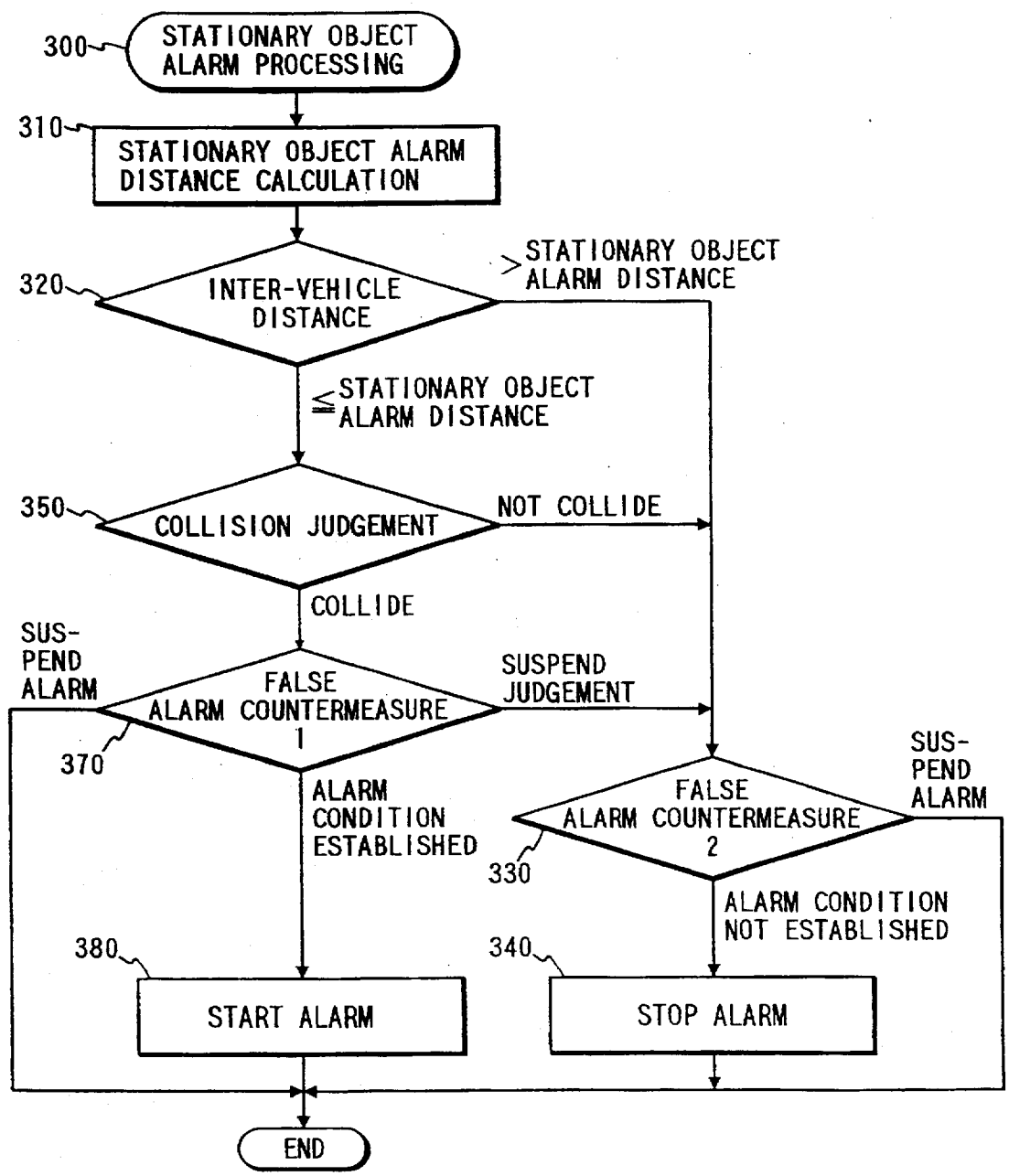
FIG. 5 is a flow chart showing a stationary object alarm processing in accordance with the present invention.

Returning the flow chart of FIG. 3, when the concerned object is a stationary object in the step 100, the stationary object alarm processing (step 300) is executed. FIG. 5 is a flow chart showing the details of the stationary object alarm processing. Among steps in the flow chart of FIG. 5, steps 320, 330, 340, 350, 370 and 380 are substantially identical with the steps 220, 230, 240, 250, 270 and 280 of the flow chart of FIG. 4. A step 310 calculates a stationary object alarm distance, which will be simply obtained by a conventional method. That is, the stationary object alarm distance is proportional to the vehicle speed VR of the own vehicle. The step 320 makes a judgement as to whether or not the concerned stationary object approaches within the stationary object alarm distance. From the nature of the stationary object, the flow chart of FIG. 5 does not include a processing similar to the auxiliary collision judgement (Step 260). Thus, once no collision is predicted in the step 350, the false alarm countermeasure 2 (Step 330) is immediately started. Contents of other steps will be readily understood from the explanation of FIG. 4.

In this manner, if the alarm condition is established in the step 370 of FIG. 5, the alarm generator 13 actually starts generating alarm (Step 380), thereby notifying the driver of the own vehicle of the coming-up danger.

In summary, the above-described embodiment of the present invention first detects whether the distance between the preceding vehicle and the own vehicle is smaller than a reference distance, and then judges as to whether there is the possibility of collision between the two vehicles.

Figure 13:
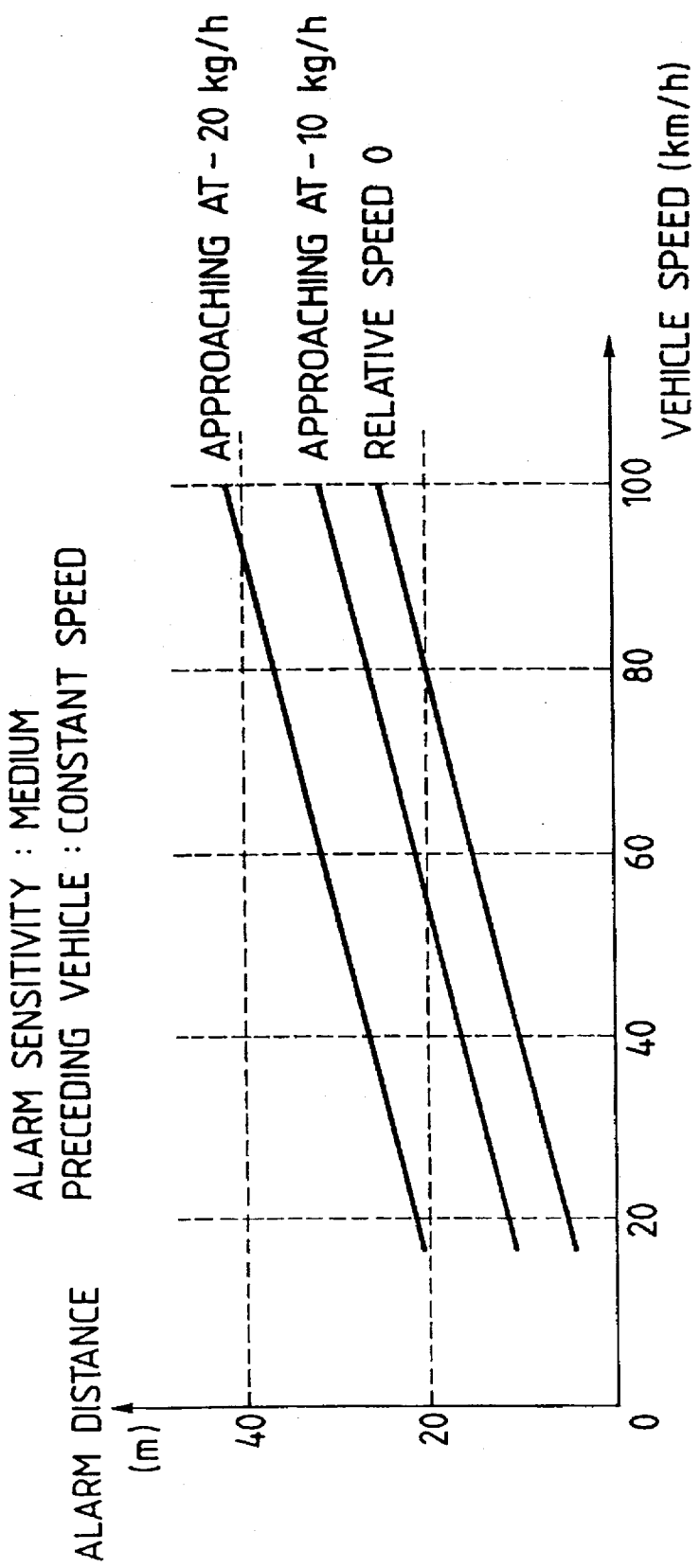
FIG. 13 is a graph showing setting conditions of alarm distances in accordance with the present invention.

Next, various setting of the mobile object alarm distance (i.e. reference distance) SL are shown in FIG. 13. When the two vehicles are approaching with a large relative speed (VRR=−20 km/h), the degree of danger increases correspondingly; thus, the alarm distance SL is set larger. As the absolute value of the relative speed decreases (VRR=−20 km/h→−10 km/h→0), the magnitude of the alarm distance SL is also set smaller. On the other hand, the degree of danger increases with increasing speed of the own vehicle. Thus, the alarm distance SL is set longer as the vehicle speed increases.

Figure 14A:
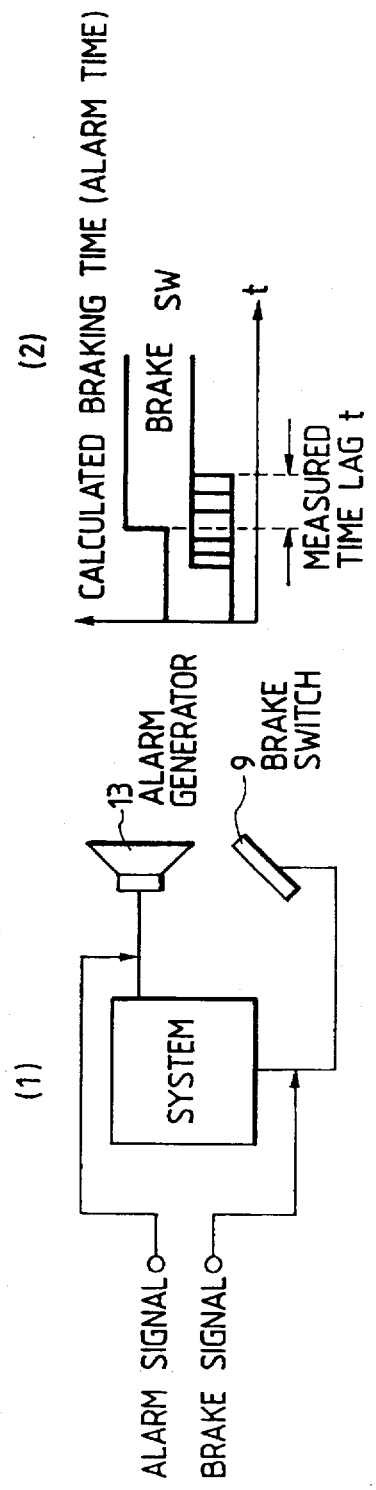
FIGS. 14A and 14B are views showing a measuring device used for demonstrating the effect of the present invention and graphs showing the measuring results.
Figure 14B:
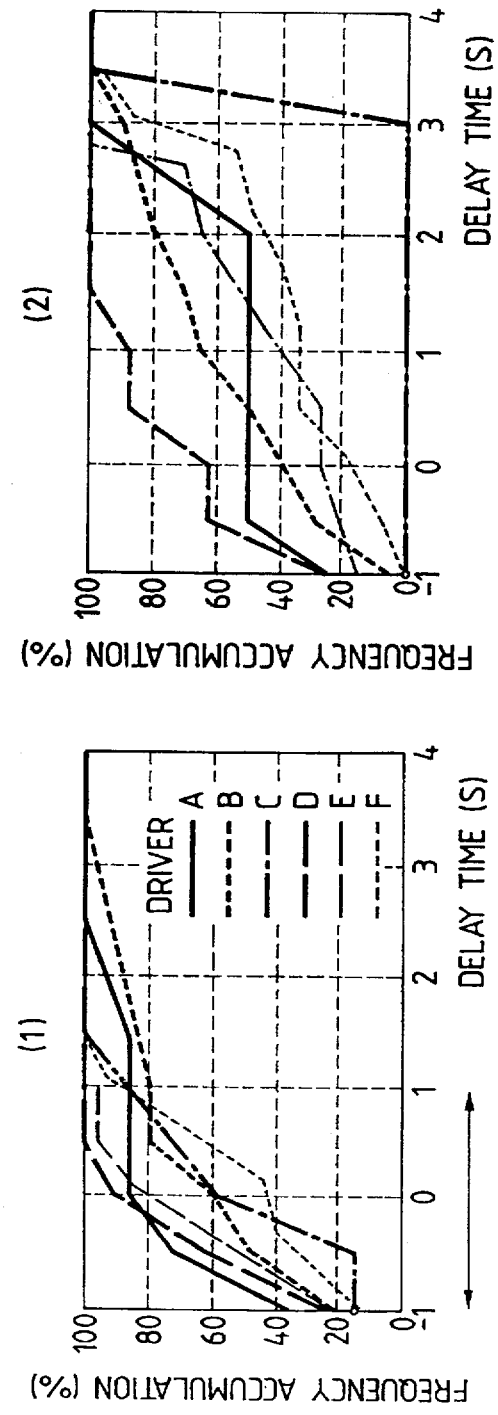

The steps 210 and 220, detecting the inter-vehicle distance SL at which the alarm operation should be started, use the data which well meet the human senses as described above. Hence, the driver of the own vehicle will not feel strangeness in the detection of the preceding vehicle, therefore the alarm of collision will be preferably done. To demonstrate the effects of the present embodiment, the inventors of the present invention conducted various measurements. FIGS. 14A and 14B are views showing the measuring device used for demonstrating the effects of the present invention and graphs showing the measured results.

FIG. 14A-(1) shows an arrangement of the measuring device which detects the alarm signal sent to the alarm generator 13 of the collision alarm system 1 of the present embodiment, and also detects the brake signal obtained from the brake switch 9. Using such a measuring device, a time lag between the two, alarm and brake, signals is measured as shown in FIG. 14A-(2).

FIG. 14B-(1) shows the experiential data measured by using plural vehicles and plural drivers travelling on real roads. On the other hand, FIG. 14B-(2) shows the result obtained by a comparative system which dose not rely on the factors TIMEK, TIMEN, GR and GA. As apparent from FIG. 14B-(1), all of the drivers agreed at a rate of 80% in that the time lag was within 1 sec. However, according to the comparative system (FIG. 14B-(s)), it was found that a large deviation arose due to differences of human senses and physical abilities between the drivers. As a result, it was proved that the present embodiment can provide an excellent inter-vehicle distance detection & collision alarm system which well meets the human sense and individuality.

Next, a second embodiment of the present invention will be explained. The second embodiment is different from the above first embodiment in that settings of the driver's individuality is automatic whereas the first embodiment uses the alarm sensitivity setting device 25 manually operated by drivers.

Figure 10:
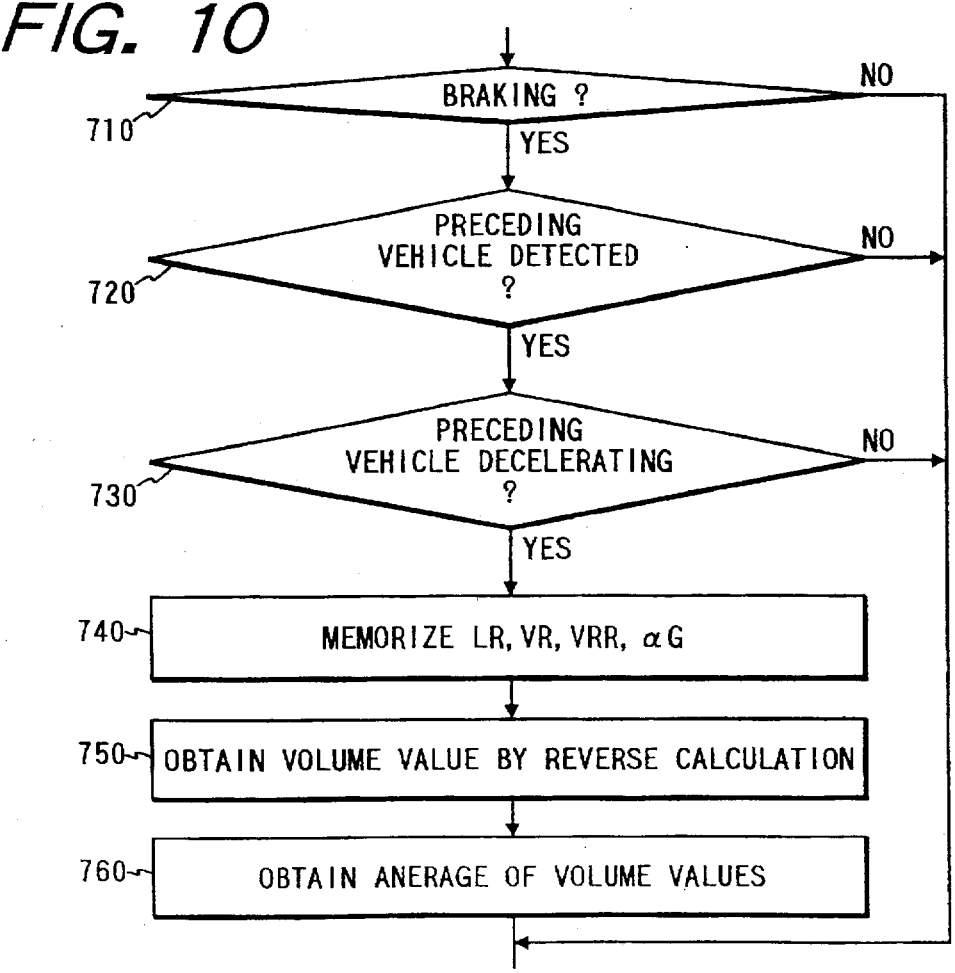
FIG. 10 is a flow chart showing an automatic sensing volume setting processing in accordance with a second embodiment of the present invention.

FIG. 10 is a flow chart showing the automatic sensing volume setting processing in accordance with the second embodiment, which should be entered before the step 100 of FIG. 3 flow chart.

First, a judgement is made as to whether the braking is applied (Step 710). Next, it is judged whether the preceding vehicle is detected (Step 720). Subsequently judged is whether the preceding vehicle is decelerating (Step 730). Only when the own vehicle is applying brake while the preceding vehicle is detected and is decelerating ("YES" in all of steps 710, 720 and 730), a step 740 is executed. Otherwise, the procedure goes to the step 100.

In the step 740, present values of the actual inter-vehicle distance LR, the own vehicle speed VR, the preceding vehicle relative speed VRR, and the preceding vehicle acceleration $\alpha G$ are calculated based on the data measured by the distance scanning device 5 and the vehicle sensor 7. These calculated data are memorized in a memory (RAM).

Next, the alarm sensitivity setting volume commonly shown in FIGS. 11A, 11B, 12A and 12B is obtained through the reverse calculation of equation (1) using these data LR, VR, VRR and $\alpha G$ (Step 750). Each factor shown in FIGS. 11A, 11B, 12A and 12B is selected in accordance with the volume value being set by the alarm sensitivity setting device 25. Hence, in the equation (1), it is assumed SL=LR. The remaining unknown factors TIMEK, TIMEN, GR and GA, in view of the nature that these values are respectively determined at a predetermined rate, can be obtained by entering the values of LR, VR, VRR and $\alpha G$ in the equation (1).

Thus obtained volume value can be directly used. However, to avoid abnormal values by noises, the final volume value is obtained by averaging new and old volume values (Step 760). In cases where the old volume value is not available, it will be preferable to take an average between the present (new) volume value and the setting value of the alarm sensitivity setting device 25.

Although each of the above embodiments adopts the equation (1), the mobile object alarm distance (i.e. reference distance) can be simply obtained by using the following equation (2) which omits the term $\alpha G \cdot GA$.

$$SL = VR \cdot TIMEK - VRR \cdot TIMEN + VRR^2/(2 \cdot GR) \qquad (2)$$

Although the above embodiments provide the collision judgement (Steps 250 and 260) after detecting the inter-vehicle distance (Steps 210 and 220), the collision judgement (Steps 250 and 260) can be removed if the alarm processing needs to be simplified. More specifically, in the flow chart of FIG. 4, if the actual inter-vehicle distance LR is not larger than the mobile object alarm distance SL, the procedure directly goes to the step 270 without executing the steps 250 and 260.

As apparent from the foregoing description, the distance scanning device 5, the vehicle speed sensor 7, the coordinate conversion block 41, the object recognition block 45, the vehicle calculating block 49, the relative speed calculating block 51, and the preceding vehicle acceleration calculating block 53 cooperatively act as running condition detecting means for detecting the distance between the preceding vehicle and the own vehicle, the relative speed and relative acceleration of the preceding vehicle with respect to the own vehicle.

The alarm judgement & cruise judgement block 55 (corresponding to the step 210 in FIG. 4) functions as reference distance calculating means for obtaining a reference distance on the basis of the data measured by the above running condition detecting means.

Furthermore, the alarm judgement & cruise judgement block 55 (corresponding to the step 220 in FIG. 4) functions as comparing means for comparing the distance between the two vehicles with the reference distance to generate a comparison result.

The steps 220, 240 and 280 of FIG. 4 cooperatively function as alarm processing for giving alarm when the distance between the two vehicles is reduced less than the reference distance.

The steps 220, 240, 250, 260 and 280 of FIG. 4 cooperatively function as alarm processing for not only giving alarm but also judging the possibility of collision.

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A measuring apparatus comprising:

measuring means for measuring an actual distance between a vehicle and an object positioned in front of said vehicle;

calculating means for calculating a reference distance between said vehicle and said object based on traveling conditions of said vehicle and said object, respectively; and judging means for judging whether said actual distance measured by said measuring means is less than said reference distance calculated by said calculating means, wherein said calculating means comprises:

first means for determining a personal space for a given driver in accordance with a speed of said vehicle, said personal space being defined as a subjectively determined distance between said vehicle and said object at which said given driver is brought into a state of uneasiness;

second means for obtaining a free running distance, said free running distance representing a distance that said vehicle travels until a vehicle braking operation is effected; and third means for obtaining a braking distance, said braking distance representing a distance that said vehicle travels until said vehicle is stopped, after said vehicle braking operation is effected, wherein said calculating means calculates said reference distance based on said personal space obtained by said first means, said free running distance obtained by said second means, and said braking distance obtained by said third means, and wherein said calculating means calculates said reference distance using the formula:

$$VR \cdot TIMEK - VRR \cdot TIMEN + VRR^2/(2 \cdot GR)$$

where VR represents said speed of said vehicle, TIMEK represents an uneasy factor expressed in terms of time and corresponding to said personal space, VRR represents a relative speed between said vehicle and said object, TIMEN represents a response factor corresponding to a response time for actuating said vehicle braking operation, and GR represents a braking deceleration factor corresponding to a depressing strength of a braking pedal in said vehicle braking operation.

2. The measuring apparatus in accordance with claim 1, wherein said personal space, said free running distance, and said braking distance are determined based on experiential data collected from a given driver's driving habits.

3. The measuring apparatus in accordance with claim 1, wherein said respective travelling conditions of said vehicle and said object are measured as experiential data in relation to braking conditions of said vehicle, wherein said reference distance is corrected based on said experiential data.

4. The measuring apparatus in accordance with claim 1, wherein said reference distance is manually adjustable.

5. The measuring apparatus in accordance with claim 1, wherein said TIMEK, TIMEN and GR are variable to adjust said reference distance.

6. The measuring apparatus in accordance with claim 5, wherein said TIMEK, TIMEN and GR are varied with a predetermined correlation therebetween.

7. The measuring apparatus in accordance with claim 1, further comprising alarm means for generating an alarm when said judging means detects that said actual distance between said vehicle and said object is less than said reference distance.

8. The measuring apparatus in accordance with claim 1, further comprising:

collision predicting means for determining a possibility of collision, when said judging means detects that said actual distance between said vehicle and said object is less than said reference distance; and alarm means for generating an alarm when said collision predicting means determines that possibility of collision exists.

9. A measuring apparatus comprising:

measuring means for measuring an actual distance between a leading vehicle and a following vehicle traveling in generally same direction;

calculating means for calculating a reference distance based on traveling conditions of said leading vehicle and said following vehicle; and judging means for judging whether said actual distance measured by said measuring means is less than said reference distance calculated by said calculating means, wherein said calculating means comprises:

first means for determining a personal space for a given driver in accordance with a speed of said following vehicle, said personal space being defined as a subjectively determined distance between said vehicle and said object at which said given driver is brought into a state of uneasiness;

second means for obtaining a free running distance, said free running distance representing a distance that said following vehicle travels until a braking operation is effected in said following vehicle;

third means for determining a braking distance, said braking distance representing a distance that said following vehicle travels until said following vehicle is stopped after said braking operation in said following vehicle is effected; and fourth means for determining an acceleration change distance, said acceleration change distance representing a distance that said following vehicle travels due to a relative acceleration between said leading vehicle and said following vehicle, whereby said calculating means calculates said reference distance based on said personal space obtained by said first means, said free running distance obtain by said second means, said braking distance obtained by said third means, and said acceleration change distance obtained by said fourth means, and wherein said calculating means calculates said reference distance using the formula:

$$VR \cdot TIMEK - VRR \cdot TIMEN + VRR^2/(2 \cdot GR) - \alpha G \cdot GA$$

where VR represents said vehicle speed of said following vehicle, TIMEK represents an uneasy factor expressed in terms of time and corresponds to said personal space VRR represents a relative speed between said leading vehicle and said following vehicle, TIMEN represents a response factor corresponding to a response time for effecting a following vehicle braking operation, GR represents a braking deceleration factor corresponding to a depressing strength of a braking pedal in said following vehicle braking operation, $\alpha G$ represents an acceleration of said leading vehicle, and GA represents a leading vehicle deceleration factor corresponding to a depressing strength of a braking pedal in a braking operation in said leading vehicle, felt by said driver of said following vehicle.

10. The measuring apparatus in accordance with claim 9, wherein said personal space said free running distance, and said braking distance are determined based on experiential data collected from a given driver's driving habits.

11. The measuring apparatus in accordance with claim 9, wherein travelling conditions of said leading vehicle and said following vehicle are measured as experiential data in relation to braking conditions of said following vehicle, and said reference distance is corrected based on said experiential data.

12. The measuring apparatus in accordance with claim 9, wherein said reference distance is manually adjustable.

13. The measuring apparatus in accordance with claim 9, wherein said TIMEK, TIMEN, GR and GA are variable to adjust said reference distance.

14. The measuring apparatus in accordance with claim 13, wherein said TIMEK, TIMEN, GR and GA are varied with a predetermined correlation therebetween.

15. The measuring apparatus in accordance with claim 9, further comprising alarm means for generating an alarm when said judging means detects that said actual distance between said leading vehicle and said following vehicle is less than said reference distance.

16. The measuring apparatus in accordance with claim 9, further comprising:

collision predicting means for determining a possibility of collision between said leading and following vehicles, when said judging means detects that the actual distance between said leading vehicle and said following vehicle is less than said reference distance; and alarm means for generating an alarm when said collision predicting means determines that the possibility of collision exists.

17. A measuring apparatus comprising:

distance measuring means for measuring an actual distance between a vehicle and an object in front of said vehicle;

speed sensing means for measuring a speed of said vehicle;

personal data means for providing personal information corresponding to actual driving ability of a given driver of said vehicle;

calculating means, receiving data from said distance measuring means, said speed sensing means, and said personal data means, for calculating a reference distance with respect to said driving ability of said given driver of said vehicle; and judging means for judging whether said actual distance measured by said distance measuring means is smaller than said reference distance calculated by said calculating means, wherein said calculating means comprises:

first means for determining a personal warning distance based on a first personal information datum provided from said personal data means and said speed of said vehicle measured by said speed sensing means;

second means for obtaining a free-running distance based on a second personal information datum provided from said personal data means and a relative speed between said vehicle and said object, which is calculated based on measurements measured by said distance measuring means and said speed sensing means; and third means for obtaining a braking distance based on a third personal information datum provided from said personal data means and said relative speed between said vehicle and said object, calculated based on measurements measured by said distance measuring means and said speed sensing means, wherein said calculating means calculates said reference distance using the following formula:

$$VR \cdot TIMEK - VRR \cdot TIMEN + VRR^2/(2 \cdot GR)$$

where VR represents said speed of said vehicle, TIMEK represents said first personal information datum relating to said given driver's uneasiness corresponding to said personal warning distance, VRR represents said relative speed between said vehicle and said object, TIMEN represents said second personal information datum relating to a response time for a given driver's braking operation, and GR represents said third personal information datum relating to a strength with which a braking pedal is depressed by a given driver in a braking operation of said vehicle.

18. The measuring apparatus in accordance with claim 17, wherein said first, said second and said third personal information data are obtained as monitor data collected while a given driver is driving.

19. The measuring apparatus in accordance with claim 18, wherein said monitor data corresponding to said first, said second and said third personal information are data stored as map data in memory means.

20. A measuring apparatus comprising:

distance measuring means for measuring an actual distance between a vehicle and an object in front of said vehicle;

speed sensing means for measuring a speed of said vehicle;

personal data means for providing personal information corresponding to actual driving ability of a given driver of said vehicle;

calculating means, receiving data from said distance measuring means, said speed sensing means, and said personal data means, for calculating a reference distance with respect to said driving ability of said given driver of said vehicle; and judging means for judging whether said actual distance measured by said distance measuring means is smaller than said reference distance calculated by said calculating means, wherein said calculating means comprises:

first means for determining a personal warning distance based on a first personal information datum provided from said personal data means and said speed of said vehicle measured by said speed sensing means;

second means for obtaining a free-running distance based on a second personal information datum provided from said personal data means and a relative speed between said vehicle and said object, which is calculated based on measurements measured by said distance measuring means and said speed sensing means;

third means for obtaining a braking distance based on a third personal information datum provided from said personal data means and said relative speed between said vehicle and said object, calculated based on measurements measured by said distance measuring means and said speed sensing means; and fourth means for determining an acceleration change distance based on a fourth personal information datum provided from said personal data means and a relative acceleration between said vehicle and said object, and wherein said calculating means calculates said reference distance using the following formula:

$$VR \cdot TIMEK - VRR \cdot TIMEN + VRR^2/(2 \cdot GR) - \alpha G \cdot GA$$

where VR represents said speed of said vehicle TIMEK represents said first personal information datum relating to a given driver's uneasiness corresponding to said personal warning distance, VRR represents said relative speed between said vehicle and said object, TIMEN represents said second personal information datum relating to a response time for a given driver's braking operations, GR represents said third personal information datum relating to strength with which a braking pedal is depressed during a given driver's braking operation, $\alpha G$ represents an acceleration of said object, and GA represents said fourth personal information datum relating to deceleration of said object perceived a given driver of said vehicle.

21. A measuring apparatus comprising:

distance measuring means for measuring an actual distance between a vehicle and an object positioned in front of said vehicle;

speed sensing means for measuring a speed of said vehicle;

relative speed calculating means for calculating a relative speed between said vehicle and said object based on data measured by said distance measuring means and said speed sensing means; and alarm judging means, receiving data from said speed sensing means and said relative speed calculating means, for calculating a reference distance for preventing a collision between said vehicle and said object, said alarm judging means calculating said reference distance using the formula:

$$VR \cdot TIMEK - VRR \cdot TIMEN + VRR^2/(2 \cdot GR)$$

where VR represents said speed of said vehicle, TIMEK represents an uneasy factor relating to uneasiness of a given driver, VRR represents said relative speed between said vehicle and said object, TIMEN represents a response factor relating to a response time for a given driver's braking operation, and GR represents a deceleration factor relating to a strength with which a braking pedal is depressed in a given driver's braking operation.

22. The measuring apparatus in accordance with claim 21, wherein said alarm judging means judges whether said actual distance measured by said distance measuring means is smaller than said reference distance.

23. The measuring apparatus in accordance with claim 21, further comprising alarm sensitivity setting means for allowing each driver to manually adjust said uneasy, response, and deceleration factors.

24. A measuring apparatus comprising:

distance measuring means for measuring an actual distance between a vehicle and an object positioned in front of said vehicle;

speed sensing means for measuring a speed of said vehicle;

relative speed calculating means for calculating a relative speed between said vehicle and said object based on measurements measured by said distance measuring means and said speed sensing means;

relative acceleration calculating means for calculating a relative acceleration between said vehicle and said object; and alarm judging means, receiving data from said speed sensing means, said relative speed calculating means, and said relative acceleration calculating means, for calculating a reference distance for preventing a collision between said vehicle and said object, said alarm judging means calculating said reference distance using the formula:

$$VR \cdot TIMEK - VRR \cdot TIMEN + VRR^2/(2 \cdot GR) - \alpha G \cdot GA$$

where VR represents said speed of said vehicle, TIMEK represents an uneasy factor relating to uneasiness of a given driver, VRR represents said relative speed between said vehicle and said object, TIMEN represents a response factor relating to a response time for a given driver's braking operation, GR represents a deceleration factor relating to a strength with which a braking pedal is depressed in a given driver's braking operation, $\alpha G$ represents said relative acceleration between said vehicle and said object, and GA represents a preceding object deceleration factor perceived by a given driver of said vehicle.

25. The measuring apparatus in accordance with claim 24, wherein said alarm judging means determines whether said actual distance measured by said distance measuring means is less than said reference distance.

26. The measuring apparatus in accordance with claim 24, further comprising alarm sensitivity setting means for allowing each driver to manually adjust said uneasy, response, and deceleration factors.

* * * * *